(12) United States Patent
Ohmori et al.

(10) Patent No.: US 8,377,611 B2
(45) Date of Patent: Feb. 19, 2013

(54) ASSEMBLING METHOD OF SOLID OXIDE FUEL CELL

(75) Inventors: Makoto Ohmori, Nagoya (JP); Natsumi Shimogawa, Nagoya (JP); Masayuki Shinkai, Ama-Gun (JP); Toshiyuki Nakamura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 602 days.

(21) Appl. No.: 12/538,370

(22) Filed: Aug. 10, 2009

(65) Prior Publication Data

US 2010/0050422 A1 Mar. 4, 2010

(30) Foreign Application Priority Data

Aug. 27, 2008 (JP) ................................ 2008-217676

(51) Int. Cl.
*H01M 8/00* (2006.01)
*H01M 8/10* (2006.01)
*H01M 2/08* (2006.01)

(52) U.S. Cl. ......................... 429/535; 429/495; 429/509

(58) Field of Classification Search .................. 429/465, 429/468–469, 491, 495–496, 507–509, 535
See application file for complete search history.

(56) References Cited

U.S. PATENT DOCUMENTS

| 6,430,966 | B1 * | 8/2002 | Meinhardt et al. | ................ 65/43 |
| 2005/0153177 | A1 * | 7/2005 | Gitzhofer et al. | ............... 429/19 |

FOREIGN PATENT DOCUMENTS

| EP | 1693914 | * | 8/2006 |
| EP | 710857 | * | 10/2006 |
| JP | 2004-342584 | | 12/2004 |

* cited by examiner

*Primary Examiner* — Ula C. Ruddock
*Assistant Examiner* — Thomas H. Parsons
(74) *Attorney, Agent, or Firm* — Burr & Brown

(57) ABSTRACT

An assembling method of a solid oxide fuel cell, having a stack structure in which sheet bodies and separators are stacked in alternating layers, includes a stacking step, a sealing step, and a reduction process step. In the sealing step, a laminate in which a crystallized glass material is interposed between the perimetric portions adjacent to each other is heated, so that the crystallization rate of the crystallized glass is increased to 0 to 50%. Accordingly, the perimetric portions adjacent to each other are integrated and sealed, and a room for glass softening is left. In the reduction process step, the laminate is heated, and a reduction gas is supplied into a fuel channel, whereby the reduction process is performed to the fuel electrode layer, and the crystallization rate is increased to 70 to 100%. Thus, the assembly of the fuel cell is completed.

4 Claims, 8 Drawing Sheets

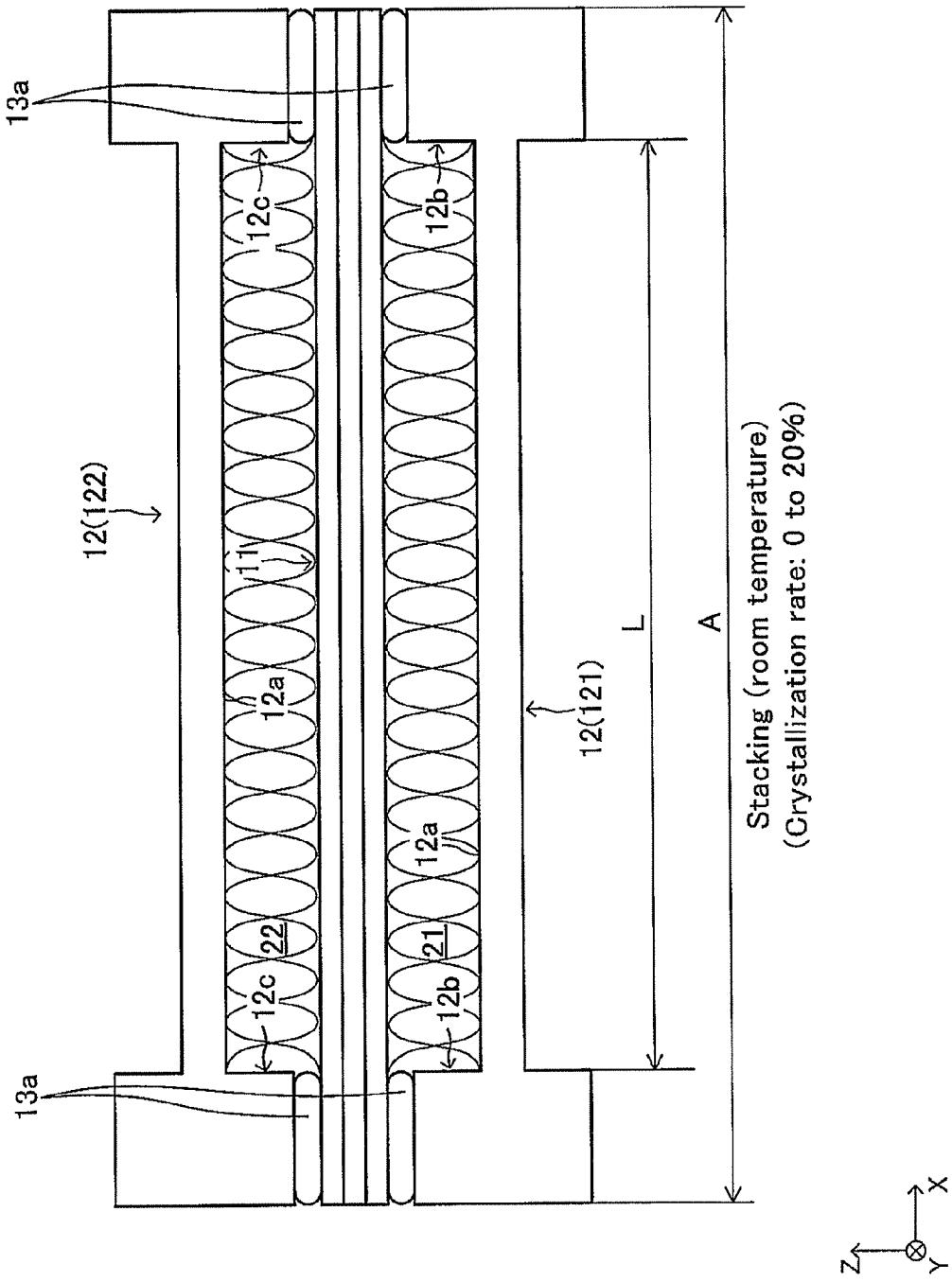

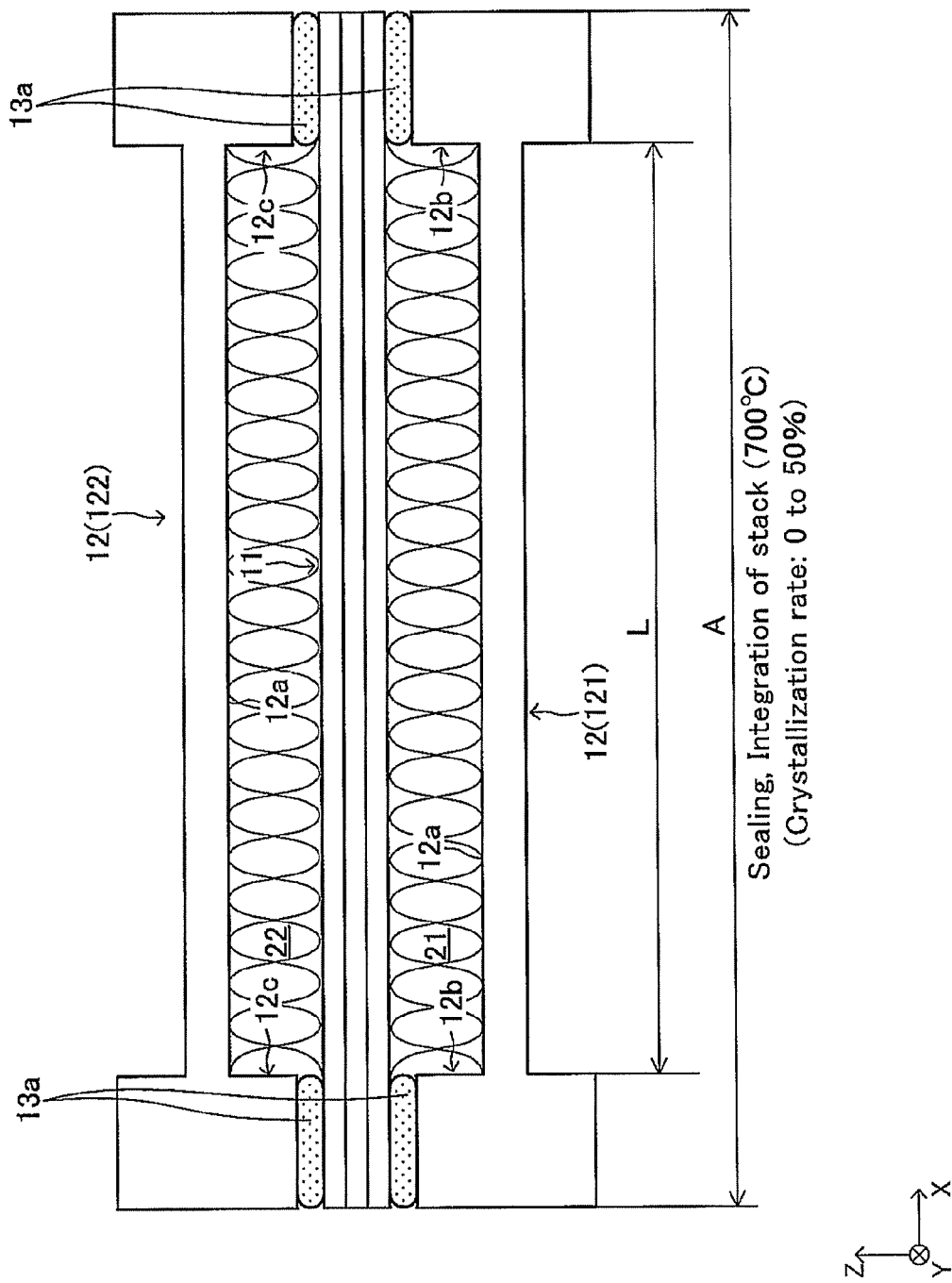

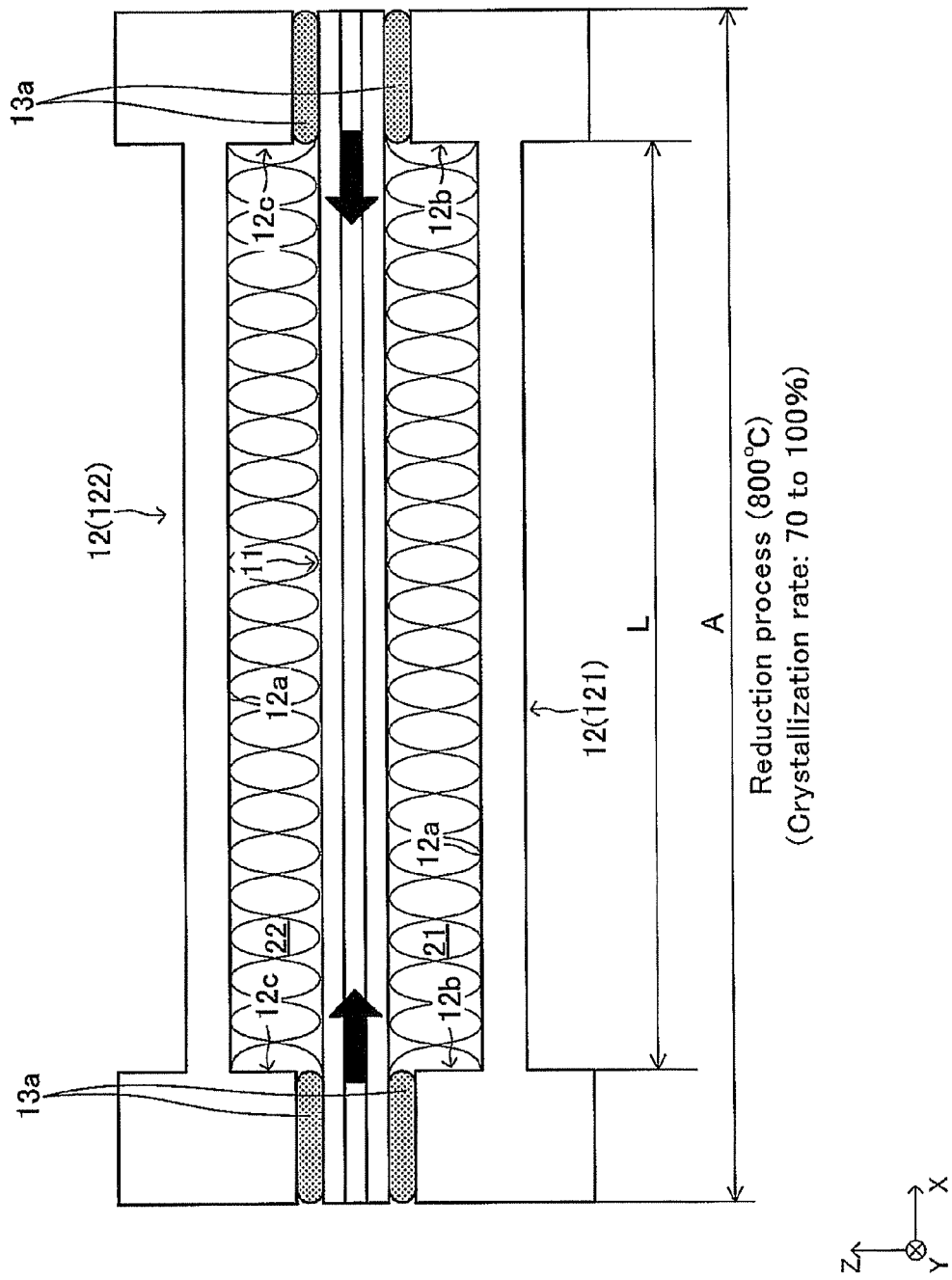

ASSEMBLING METHOD OF SOLID OXIDE FUEL CELL

BACKGROUND OF THE INVENTION

1. Field of the Invention

The present invention relates to an assembling method of a solid oxide fuel cell (SOFC), and particularly to an assembling method of a solid oxide fuel cell having a (flat-plate) stack structure in which sheet bodies and support members are stacked in alternating layers.

2. Description of the Related Art

Conventionally, a solid oxide fuel cell having the above-mentioned stack structure has been known (refer to, for example, Japanese Patent Application Laid-Open (kokai) No. 2004-342584). In this case, the sheet body (may also be referred to as "single cell") can be a fired body in which a solid electrolyte layer formed from zirconia, a fuel electrode layer, and an air electrode layer are arranged in layers such that the fuel electrode layer is formed on the upper surface of the solid electrolyte layer and such that the air electrode layer is formed on the lower surface of the solid electrolyte layer. For each sheet body, the support member (may also be referred to as a "separator") adjacent to the upper side of the sheet body is also referred to as an upper support member, and the support member adjacent to the lower side of the sheet body is also referred to as a lower support member.

For each sheet body, the perimetric portion of the sheet body is held by the perimetric portion of the upper support member and the perimetric portion of the lower support member, so that a fuel channel through which a fuel gas flows is formed and defined in a space between the lower surface of a plane portion, which is positioned at the inner side of the perimetric portion of the upper support member, and the upper surface of the fuel electrode layer of the sheet body. Further, an air channel through which a gas (air) containing oxygen flows is formed and defined in a space between the upper surface of the plane portion, which is located at the inner side from the perimetric portion of the lower support member, and the lower surface of the air electrode layer of the sheet body.

In the structure described above, a fuel gas is supplied to the fuel channel and air is supplied to the air channel with the temperature of the SOFC being raised and heated to a working temperature (e.g., 800° C., hereinafter merely referred to as the "working temperature") of the SOFC. Thus, the fuel gas and air are brought into contact with the upper surface and the lower surface of each of the sheet bodies respectively, whereby electricity generating reaction is produced for each sheet body.

SUMMARY OF THE INVENTION

In order not to allow the fuel gas in the fuel channel and the air in the air channel to mix with each other and in order to prevent the fuel gas and the air from leaking to the outside, as well as in order to keep the overall shape of the fuel cell, the perimetric portion of the sheet body, the perimetric portion of the upper support member, and the perimetric portion of the lower support member are sealed to one another with a seal member for fixation for each sheet body in the SOFC having the above-mentioned stack structure.

On the other hand, when the fired body is used as the sheet body as described above, a reduction process has to be performed to the fuel electrode layer of the fired sheet body in order to make the fuel electrode layer function as a fuel electrode (anode electrode) of the SOFC. The reduction process is executed by supplying a reduction gas (e.g., hydrogen) to the surface of the fuel electrode layer. In this case, it is necessary to take a measure for preventing the reduction gas from being supplied to the surface of the air electrode layer.

In the stack structure in which the sealing and fixation are achieved by the seal member as described above, the fuel channel and the air channel are airtightly defined by the seal member. Accordingly, when the reduction gas is supplied to each fuel channel in the stack structure so as to perform the reduction process, the supply of the reduction gas to the surface of the air electrode layer can be prevented without taking a specific measure for preventing the reduction gas from being supplied to the surface of the air electrode layer.

When the reduction process is executed to the fuel electrode layer, the fuel electrode layer contracts in general, with the result that the sheet body entirely contracts. Therefore, even when the reduction gas is fed to each fuel channel in the stack structure, in which the sealing and fixation are achieved by the seal member as described above, so as to perform the reduction process, the sheet body is likely to contract similarly. However, in this case, the sheet body is fixed to the perimetric portions of the upper and lower support members by the seal member at its perimetric portion. As a result, the sheet body receives tensile force in the direction along the plane direction from the upper and the lower support members at its perimetric portion.

When the seal member makes the relative movement completely impossible, the tensile force (thermal stress) exerted on the sheet body becomes excessive, which entails a problem of cracks generated on the sheet body. This problem is likely to arise, as the thickness of the sheet body is smaller.

Accordingly, an object of the present invention is to provide an assembling method of a small-sized SOFC having a (flat-plate) structure in which sheet bodies, each of which is a fired body including a solid electrolyte layer, a fuel electrode layer, and an air electrode layer, and support members are stacked in alternating layers, wherein cracks generated on the sheet body because of a contraction of the sheet body when a reduction process is performed to the fuel electrode layer of the fired sheet body.

In order to attain the foregoing object, an SOFC to which an assembling method of an SOFC according to the present invention is applied includes a single or a plurality of sheet bodies that has a solid electrolyte layer, a fuel electrode layer formed on the upper surface of the solid electrolyte layer, and an air electrode layer formed on the lower surface of the solid electrolyte layer, these layers being stacked and fired, and a plurality of support members for supporting the single or the plurality of sheet bodies, wherein the sheet bodies and the support members are stacked in alternating layers. For each sheet body, the upper surface of the perimetric portion of the sheet body and the lower surface of the perimetric portion of the upper support member, as well as the lower surface of the perimetric portion of the sheet body and the upper surface of the perimetric portion of the lower support member are respectively sealed in order that the perimetric portion of the sheet body is held between the lower surface of the perimetric portion of the upper support member and the upper surface of the perimetric portion of the lower support member. Further, for each sheet body, a fuel channel through which a fuel gas is supplied is defined and formed in a space formed between a lower surface of a plane portion located at the inner side from the perimetric portion of the upper support member and the upper surface of the fuel electrode layer in the sheet body, and an air channel through which a gas containing oxygen is supplied is defined and formed in a space formed between the upper surface of the plane portion located at the inner side from the perimetric portion of the lower support member and the lower surface of the air electrode layer in the sheet body. From the viewpoint of downsizing the reactor as a whole, it is preferable that the thickness of each sheet body is 20 μm or more and 500 μm or less, and that each sheet body has a uniform thickness.

The assembling method of an SOFC according to the present invention includes a stacking step in which the sheet bodies and the support members are stacked in alternating layers with a crystallized glass material interposed between the perimetric portion of each of the sheet bodies and the perimetric portion of each of the support members adjacent to the sheet body; a sealing step in which the crystallization rate of the crystallized glass is increased to 0 to 50% through the application of heat to the resultant laminate in order to seal the perimetric portion of the sheet body and the perimetric portion of the support member adjacent to the sheet body; and a reduction process step in which the resultant laminate, which has been subject to the sealing step, is heated and a reduction gas is supplied into the fuel channel, by which the crystallization rate of the crystallized glass is increased to 70 to 100%, and the reduction process is performed to the fuel electrode layer. The heat-treatment temperature in the sealing step is preferably 500 to 800° C., and the heat-treatment temperature in the reduction process step is preferably 650 to 900° C.

As described above, in the present invention, the crystallized glass is used as the seal member, wherein the crystallization rate of the crystallized glass is adjusted in two stages. Specifically, the sealing step is executed as the first stage. In the sealing step, the laminate formed in the stacking step with the crystallized glass material interposed is heated. As a result, the crystallization rate is increased to 0 to 50%. In other words, an amorphous region is consciously left. The crystallization rate indicates the ratio of presence (volume percent) of the crystalline region in the crystallized glass material. The crystallization rate of the crystallized glass, which is a subject to be measured, can be measured by utilizing a diffraction peak of the main phase in X-ray diffraction between a crystallized glass material (a reference crystallized glass material), which is confirmed that, by means of an X-ray diffraction and thermal analysis, the amorphous region is not present after the heat treatment with a sufficiently high temperature is performed, and the crystallized glass material that is the subject to be measured.

Thus, for each sheet body, the perimetric portion of the sheet body can be sealed to the perimetric portions of the upper and lower support members with the crystallized glass. Further, since the amorphous region is sufficiently left, the amorphous region is softened, when the temperature of the laminate then becomes not less than the softening point of the crystallized glass, whereby the state in which the perimetric portion of the sheet body can move relative to the perimetric portions of the upper and the lower support members can be obtained.

After the sealing step is completed, the reduction process step is executed next as the second stage. In the reduction process step, the laminate is heated, and the reduction gas (e.g., hydrogen gas) is supplied into the fuel channel so as to perform the reduction process to the fuel electrode layer. As a result, the reduction process can be executed during when the state in which the perimetric portion of the sheet body can move relative to the perimetric portions of the upper and the lower support members due to the temperature of the laminate being not less than the softening point can be obtained. Therefore, even when the above-mentioned tensile force is applied to the sheet body from the upper and the lower support members because of the contraction of the sheet body caused by the reduction process, the tensile force can be prevented from becoming excessive. Consequently, the production of cracks on the sheet body can be suppressed. After the reduction process is completed, the fuel electrode layer can serve as a fuel electrode (anode electrode) of the SOFC.

After the sealing step is completed, the fuel channel and the air channel are airtightly defined with the crystallized glass. Accordingly, when the reduction gas is supplied to the fuel channel for performing the reduction process after the completion of the sealing step, the supply of the reduction gas to the surface of the air electrode layer can be prevented without taking a special measure for preventing the supply of the reduction gas to the surface of the air electrode layer.

In the reduction process step, the crystallization rate is increased to 70 to 100% (the amorphous region is reduced). Thus, for each sheet body, the perimetric portion of the sheet body can be fixed to the perimetric portions of the upper and lower support members so as to hardly make relative movement regardless of temperature. Thus, the assembly of the SOFC is completed.

As described above, the glass softening is consciously allowed in the sealing step, and in the next reduction process step, the reduction process to the fuel electrode layer is executed, and the assembly of the SOFC is completed. As a result, the generation of cracks on the sheet body caused by the contraction of the sheet body due to the reduction process can be suppressed.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 6 is a schematic view, corresponding to FIG. 4, showing, with exaggeration, the surrounding of the seal member of the fuel cell shown in FIG. 1 in a laminating step;

FIG. 7 is a schematic view, corresponding to FIG. 4, showing, with exaggeration, the surrounding of the seal member of the fuel cell shown in FIG. 1 in a sealing step; and FIG. 8 is a schematic view, corresponding to FIG. 4, showing, with exaggeration, the surrounding of the seal member of the fuel cell shown in FIG. 1 in a reduction process step.

DETAILED DESCRIPTION OF THE INVENTION

A solid oxide fuel cell according to an embodiment of the present invention will next be described with reference to the drawings.

Figure 1:
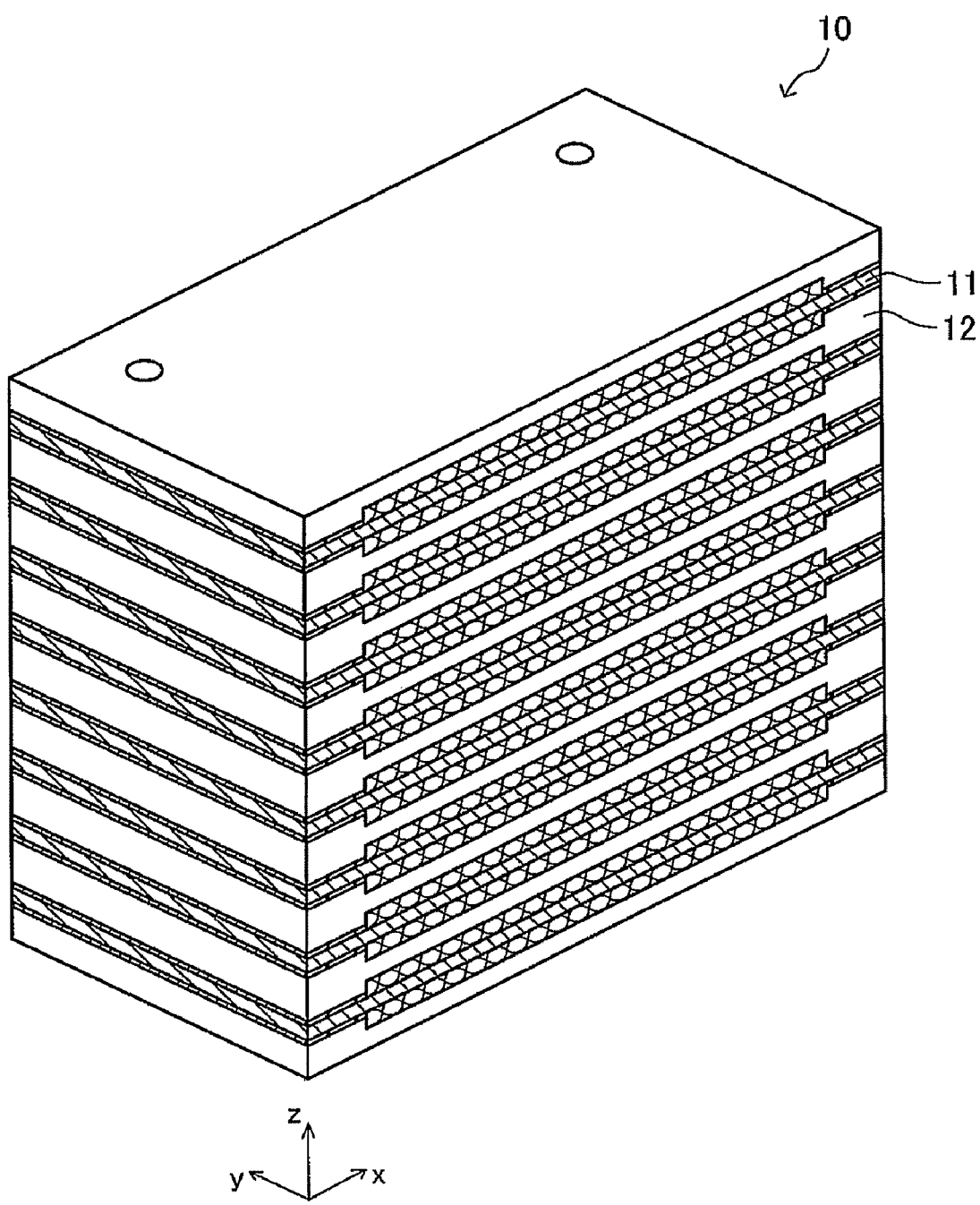
FIG. 1 is a cutaway perspective view of a solid oxide fuel cell according to an embodiment of the present invention.
Figure 2:
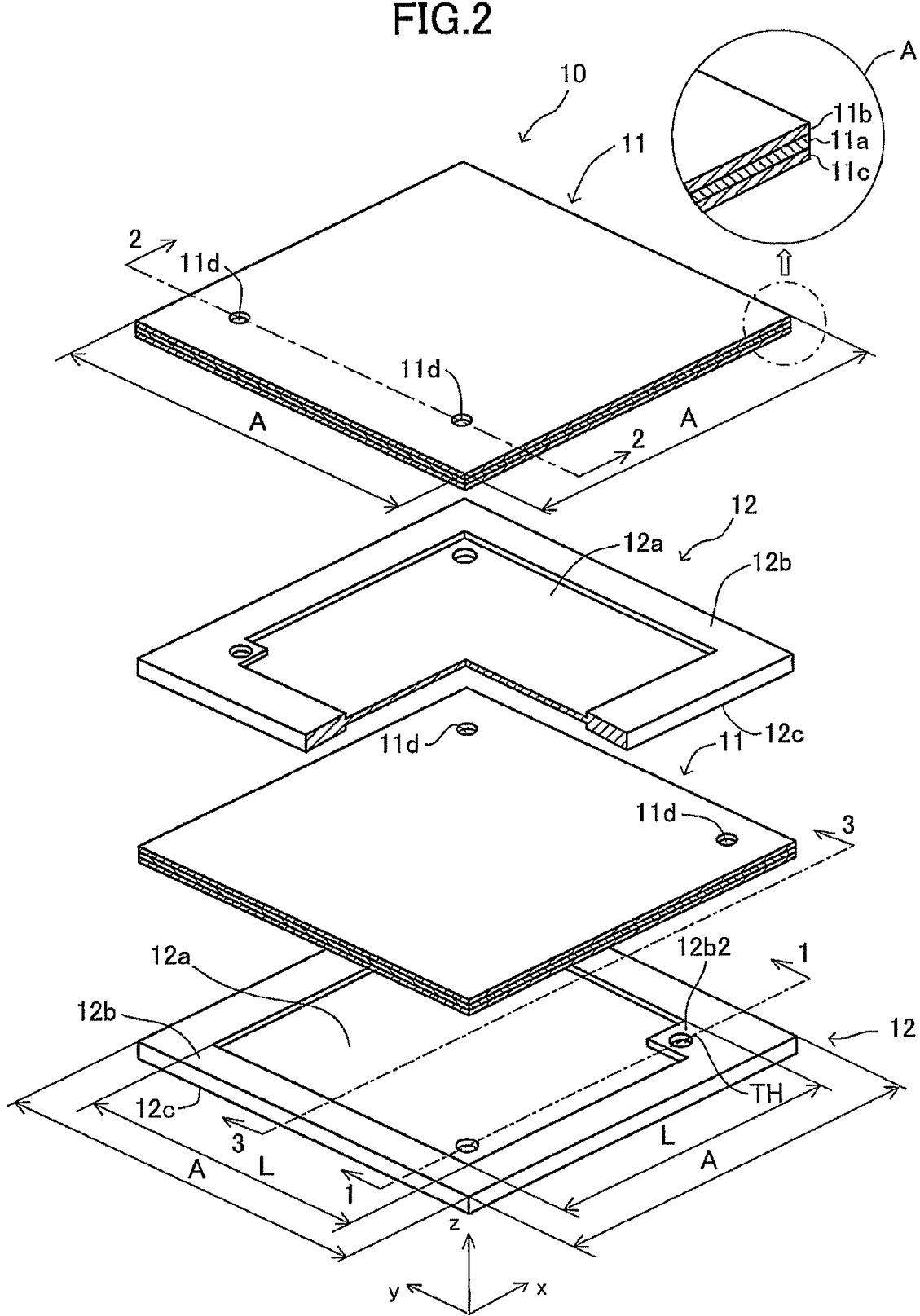
FIG. 2 is an exploded partial perspective view of the fuel cell shown in FIG. 1.

Overall Structure of Fuel Cell:

FIG. 1 perspectively shows, in a cutaway fashion, a solid oxide fuel cell (hereinafter, referred to merely as the "fuel cell") 10, which is a device according to an embodiment of the present invention. FIG. 2 perspectively and partially shows, in an exploded fashion, the fuel cell 10. The fuel cell 10 is configured such that sheet bodies 11 and support members 12 are stacked in alternating layers. That is, the fuel cell 10 has a flat-plate stack structure. The sheet body 11 is also referred to as a "single cell" of the fuel cell 10. The support member 12 is also referred to as a "separator".

As shown on an enlarged scale within a circle A of FIG. 2, the sheet body 11 is a fired body having an electrolyte layer (solid electrolyte layer) 11$a$, a fuel electrode layer 11$b$ formed on the electrolyte layer 11$a$ (on the upper surface of the electrolyte layer 11$a$), and an air electrode layer 11$c$ formed on a side of the electrolyte layer 11$a$ opposite the fuel electrode layer 11$b$ (on the lower surface of the electrolyte layer 11$a$). The planar shape of the sheet body 11 is a square having sides (length of one side=A) extending along mutually orthogonal x- and y-axes. The sheet body 11 is a plate member (thickness=t1) having a thickness along a z-axis orthogonal to the x-axis and the y-axis.

In the present embodiment, the electrolyte layer 11$a$ is a dense fired body of YSZ (yttria-stabilized zirconia). The fuel electrode layer 11$b$ is a fired body of Ni—YSZ (the fired body is a state after the later-described reduction process. It is a fired body of NiO—YSZ before the reduction process), and a porous electrode layer. The air electrode layer 11$c$ is a fired body of LSCF (lanthanum strontium cobalt ferrite) and a porous electrode layer. The electrolyte layer 11$a$, the fuel electrode layer 11$b$, and the air electrode layer 11$c$ have different room-temperature-to-1000° C. mean thermal expansion coefficients of about 10.8 ppm/K, 12.5 ppm/K, and 11.5 ppm/K, respectively.

The sheet body 11 has a pair of cell through-holes 11$d$. Each of the cell through-holes 11$d$ extends through the electrolyte layer 11$a$, the fuel electrode layer 11$b$, and the air electrode layer 11$c$. The paired cell through-holes 11$d$ are formed in the vicinity of one side of the sheet body 11 and in the vicinity of corresponding opposite ends of the side.

Figure 3:
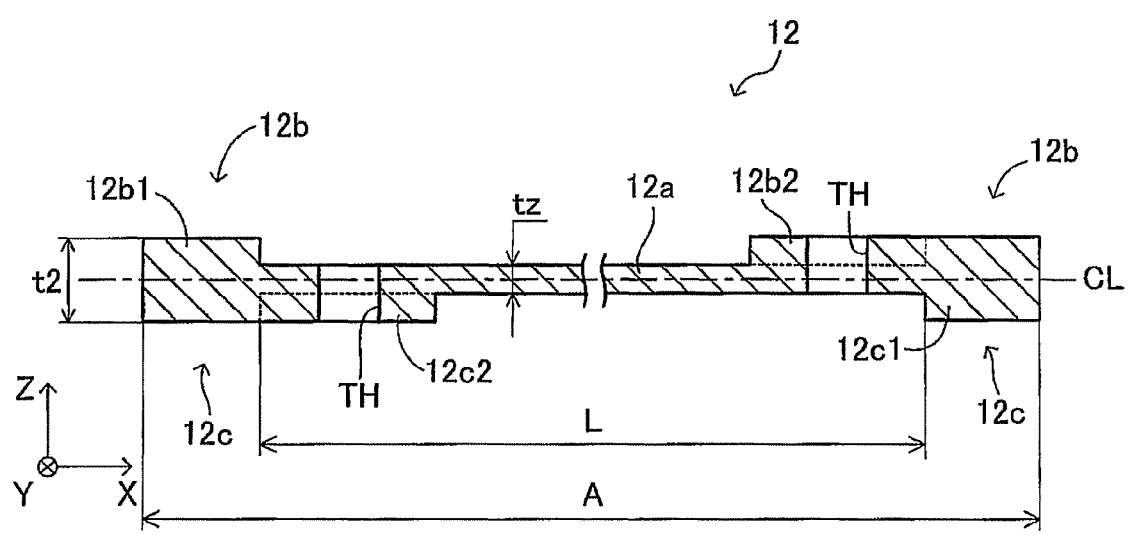
FIG. 3 is a sectional view of a support member taken along a plane that includes line 1-1 of FIG. 2 and is in parallel with an x-z plane.

FIG. 3 is a sectional view of the support member 12 taken along a plane that includes line 1-1 of FIG. 2 parallel with the x-axis and is in parallel with the x-z plane. As shown in FIGS. 2 and 3, the support member 12 includes a plane portion 12$a$, an upper frame portion 12$b$ (perimetric portion), and a lower frame portion 12$c$ (perimetric portion). The planar shape of the support member 12 is a square having sides (length of one side=A) extending along the mutually orthogonal x- and y-axes. The thickness of the plane portion 12$a$ is tz, and the thickness of the "frame portion" (perimetric portion) is t2 (>tz).

The support member 12 is formed from a Ni-based heat-resistant alloy (e.g., ferritic SUS, INCONEL 600, or HASTELLOY). The support member 12 formed from, for example, SUS 430, which is a ferritic SUS, has a room-temperature-to-1000° C. mean thermal expansion coefficient of about 12.5 ppm/K. Thus, the thermal expansion coefficient of the support member 12 is higher than the mean thermal expansion coefficient of the sheet body 11. Therefore, when the temperature of the fuel cell 10 changes, the difference in the amount of expansion and contraction is produced between the sheet body 11 and the support member 12.

The plane portion 12$a$ is a thin, flat body having a thickness along the z-axis. The planar shape of the plane portion 12$a$ is a square having sides (length of one side=L (<A)) extending along the x-axis and the y-axis.

The upper frame portion 12$b$ is a frame body provided around the plane portion 12$a$ (in a region in the vicinity of the four sides of the plane portion 12$a$; i.e., an outer peripheral region of the plane portion 12$a$) in an upwardly projecting condition. The upper frame portion 12$b$ consists of a perimetric frame portion 12$b$1 and a jutting portion 12$b$2.

The perimetric frame portion 12$b$1 is located on a side toward the perimeter of the support member 12. The vertical section of the perimetric frame portion 12$b$1 (e.g., a section of the perimetric frame portion 12$b$1 whose longitudinal direction coincides with the direction of the y-axis, taken along a plane parallel with the x-z plane) assumes a rectangular shape (or a square shape).

The jutting portion 12$b$2 juts toward the center of the support member 12 from the inner peripheral surface of the perimetric frame portion 12$b$1 at one of four corner portions of the plane portion 12$a$. The lower surface of the jutting portion 12$b$2 is integral with the plane portion 12$a$. The shape of the jutting portion 12$b$2 as viewed in plane is generally square. The upper surface (plane surface) of the jutting portion 12$b$2 is continuous with the upper surface (plane surface) of the perimetric portion 12$b$1. The jutting portion 12$b$2 has a through-hole TH formed therein. The through-hole TH also extends through a portion of the plane portion 12$a$ that is located under the jutting portion 12$b$2.

The lower frame portion 12$c$ is a frame body provided around the plane portion 12$a$ (in a region in the vicinity of the four sides of the plane portion 12$a$; i.e., an outer peripheral region of the plane portion 12$a$) in a downwardly projecting condition. The lower frame portion 12$c$ is symmetrical with the upper frame portion 12$b$ with respect to a centerline CL that halves the thickness of the plane portion 12$a$. Accordingly, the lower frame portion 12$c$ has a perimetric frame portion 12$c$1 and a jutting portion 12$c$2 that are identical in shape with the perimetric frame portion 12$b$1 and the jutting portion 12$b$2, respectively. However, the jutting portion 12$c$2 is formed at the plane portion 12$a$ in such a manner as to be diagonally opposite the jutting portion 12$b$2 as viewed in plane.

Figure 4:
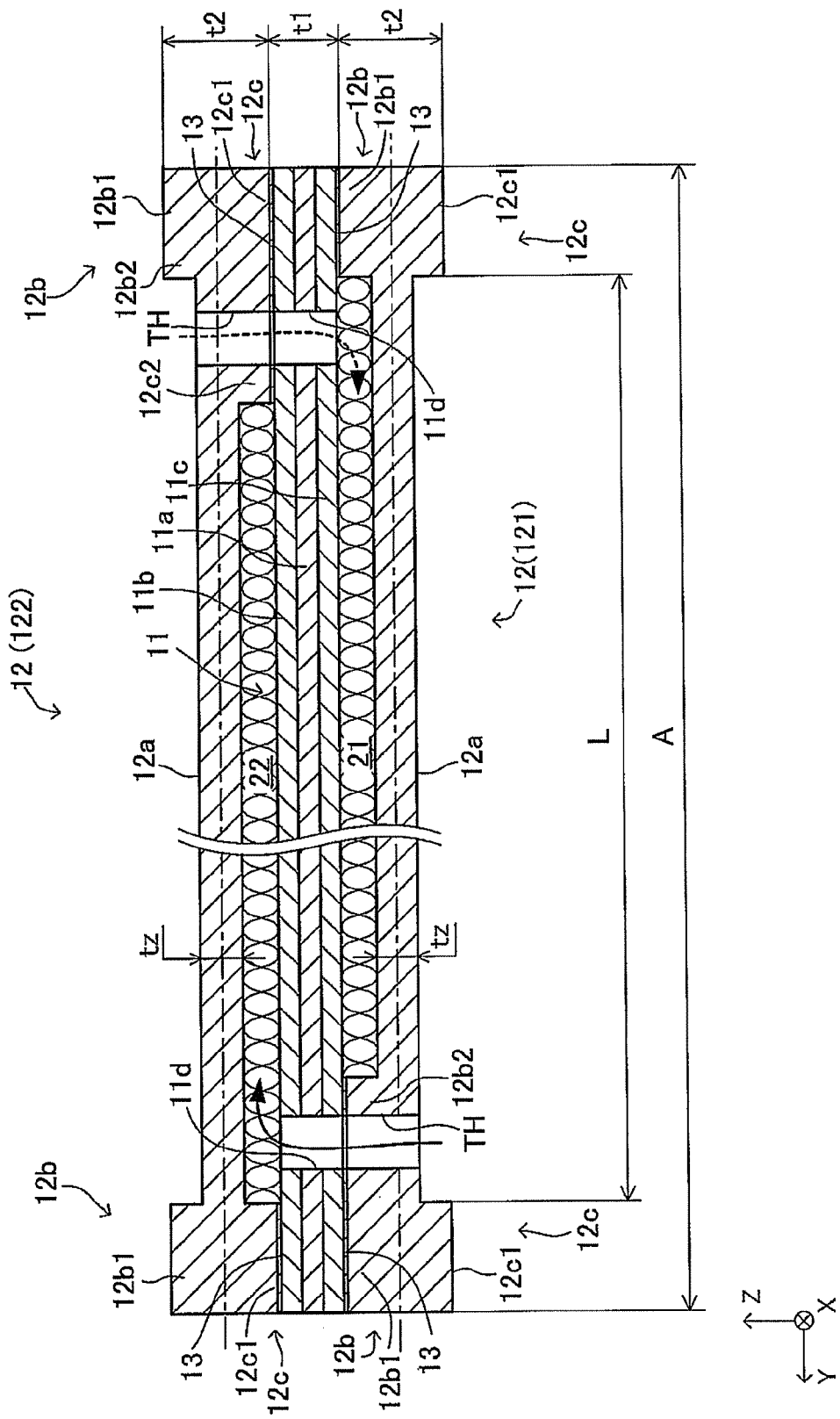
FIG. 4 is a vertical sectional view of the sheet body and the support member, which holds the sheet body, shown in FIG. 1, taken along a plane that includes line 2-2 of FIG. 2 and is in parallel with a y-z plane.

FIG. 4 is a vertical sectional view of the sheet body 11 and a pair of the support members 12 in a state of supporting (holding) the sheet body 11 therebetween, the sectional view being taken along a plane that includes line 2-2 of FIG. 2 parallel with the y-axis and is in parallel with the y-z plane. As described previously, the fuel cell 10 is formed by stacking the sheet bodies 11 and the separators 12 in alternating layers.

For convenience of description, of the paired support members 12, the support member 12 adjacent to the lower side of the sheet body 11 is referred to as a lower support member 121, and the support member 12 adjacent to the upper side of the sheet body 11 is referred to as an upper support member 122. As shown in FIG. 4, the lower support member 121 and the upper support member 122 are coaxially arranged such that the lower frame portion 12$c$ of the upper support member 122 is located above the upper frame portion 12$b$ of the lower support member 121 in a mutually facing manner.

The entire perimetric portion of the sheet body 11 is sandwiched between the upper frame portion 12$b$ (perimetric portion) of the lower support member 121 and the lower frame portion 12$c$ (perimetric portion) of the upper support member 122. At this time, the sheet body 11 is arranged such that the air electrode layer 11$c$ faces the upper surface of the plane portion 12$a$ of the lower support member 121 and such that the fuel electrode layer 11$b$ faces the lower surface of the plane portion 12$a$ of the upper support member 122.

The entire perimetric portion of the sheet body 11 and the entire perimetric portion of the upper frame portion 12$b$ of the lower support member 121, as well as the entire perimetric portion of the sheet body 11 and the entire perimetric portion of the lower frame member 12$c$ of the upper support member 122, are sealed (bonded) to one another, whereby they are fixed to each another so as to make the relative movement impossible. A crystallized glass (having an amorphous region left) is used as the seal member 13. During the assembly of the fuel cell 10, the crystallization ratio of the crystallized glass is stepwisely adjusted. This will be described later.

Thus, as shown in FIG. 4, the upper surface of the plane portion 12a of the lower support member 121, the inner wall surface of the upper frame portion 12b (the perimetric frame portion 12b1 and the jutting portion 12b2) of the lower support member 121, and the lower surface of the air electrode layer 11c of the sheet body 11 define an air channel 21 through which a gas containing oxygen (air) flows. The gas containing oxygen flows into the air channel 21 through the through-hole TH of the upper support member 12 and the cell through-hole 11d of the sheet body 11 as indicated by an arrow of a broken line in FIG. 4.

Similarly, the lower surface of the plane portion 12a of the upper support member 122, the inner wall surface of the lower frame portion 12c (the perimetric frame portion 12c1 and the jutting portion 12c2) of the upper support member 122, and the upper surface of the fuel electrode layer 11b of the sheet body 11 define a fuel channel 22 through which a fuel containing hydrogen flows. The fuel flows into the fuel channel 22 through the through-hole TH of the lower separator 121 and the cell through-hole 11d of the sheet body 11 as indicated by an arrow of a solid line in FIG. 4.

As shown in FIG. 4, metal meshes (e.g., metal meshes having an emboss structure) for current collection are confined in the air channel 21 and the fuel channel 22. Each of the metal meshes has elasticity in the stacking direction. Further, each of the metal meshes is confined in such a manner that elastic force in the direction in which the corresponding support member 12 and the sheet body 11 are separated from each other in the stacking direction is generated (i.e., in such a manner that a preload is generated).

By virtue of this structure, the electrical connection between the lower support member 121 and the sheet body 11 and the electrical connection between the upper support member 122 and the sheet body 11 can be secured. Further, since the metal mesh is confined, the flow channel of a gas is restricted. As a result, the area (circulation area), viewed from the plane, where the electricity-generating reaction can substantially be produced due to the circulation of the gas can be increased in the air channel 21 and the fuel channel 22, whereby the electricity-generating reaction can effectively be generated in the sheet body 11.

Figure 5:
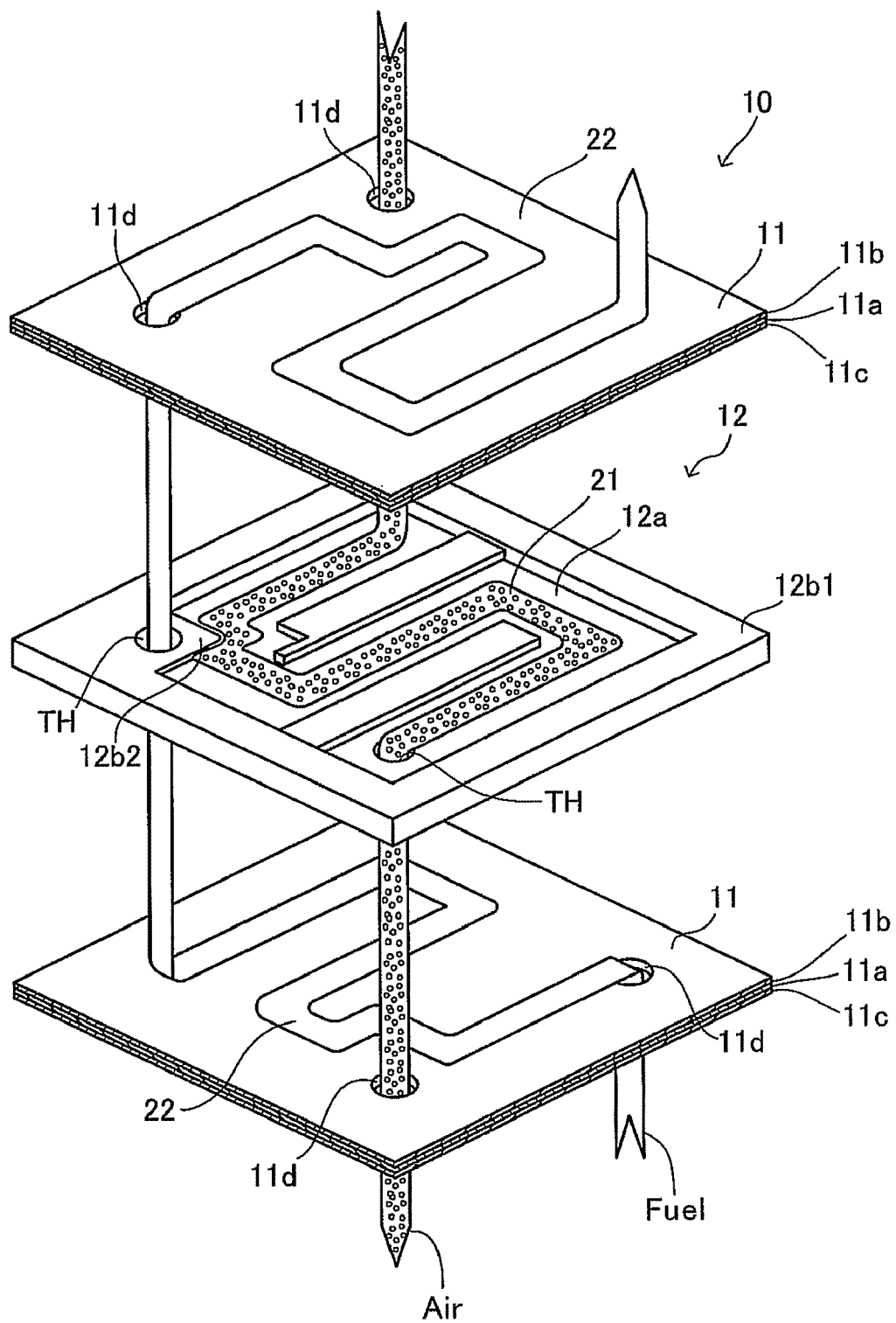
FIG. 5 is a view for explaining a circulation of fuel and air in the fuel cell shown in FIG. 1.

In the thus-configured fuel cell 10, as shown in FIG. 5, the fuel is supplied to the fuel channel 22 formed between the fuel electrode layer 11b of the sheet body 11 and the lower surface of the plane portion 12a of the support member 12, while air is supplied to the air channel 21 formed between the air electrode layer 11c of the sheet body 11 and the upper surface of the plane portion 12a of the support member 12, whereby electricity is generated while utilizing the chemical reactions expressed below by Formulas (1) and (2).

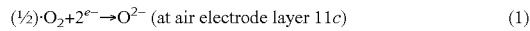
$$(1/2) \cdot O_2 + 2e^- \rightarrow O^{2-} \text{ (at air electrode layer } 11c) \quad (1)$$

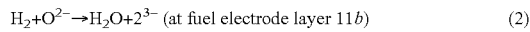
$$H_2 + O^{2-} \rightarrow H_2O + 2^{3-} \text{ (at fuel electrode layer } 11b) \quad (2)$$

Since the fuel cell (SOFC) 10 utilizes oxygen conductivity of the solid electrolyte layer 11a for generating electricity, the working temperature of the fuel cell 10 is generally 600° C. or higher. Accordingly, the temperature of the fuel cell 10 is raised from room temperature to the working temperature (e.g., 800° C.) by means of an external heating mechanism (e.g., a heating mechanism that uses a resistance heater or a heating mechanism that utilizes heat generated through combustion of a fuel gas).

The length of one side A of the planar shape (=square) of the sheet body 11 (accordingly, the support member 12) is 5 mm or more and 200 mm or less in the present embodiment. The thickness t1 of the sheet body 11 is uniform all over. In the present embodiment, the thickness t1 is 20 μm or more and 500 μm or less. For example, the thickness of the electrolyte layer 11a is 1 μm or more and 50 μm or less, the thickness of the fuel electrode layer 11b is 5 μm or more and 500 μm or less, and the thickness of the air electrode layer 11c is 5 μm or more and 200 μm or less.

The length L of one side of the planar shape (=square) of the plane portion 12a of the support member 12 is 4 mm or more and 190 mm or less in the present embodiment. The thickness t2 of the "frame portion" (perimetric portion) of the support member 12 is 200 μm or more and 1000 μm or less. The thickness tz of the plane portion 12a of the support member 12 is 50 μm or more and 100 μm or less.

Assembly of Fuel Cell, and Adjustment of Crystallization Rate of Crystallized Glass Next, one example of a method of assembling the fuel cell 10 while adjusting the crystallization rate of the crystallized glass serving as the seal member 13 will be described.

Firstly, the manufacture of the sheet body 11 used for the assembly of the fuel cell 10 will be described. Firstly explained is the case in which the sheet body 11 is a fuel-electrode-support-type (the fuel electrode layer serves as a support substrate). A sheet (that is to become the fuel electrode layer 11b) made of NiO and YSZ is firstly prepared. Then, a ceramic sheet (YSZ tape) prepared by a green sheet process is laminated on the lower surface of the sheet. The resultant laminate is fired at 1400° C. for one hour. Subsequently, a sheet (that is to become the air electrode layer 11c) is formed by a printing process on the lower surface of the resultant laminate (fired body), and the resultant laminate is fired at 850° C. for one hour. Thus, the sheet body 10 (before the reduction process) is formed. In this case, instead of using the YSZ tape, a ceramic sheet may be formed by a printing process on the lower surface of the sheet (that is to become the fuel electrode layer 11b) made of NiO and YSZ. Further, a celia layer (CeO_2) serving as a reaction preventing layer may be formed between the electrolyte layer and the air electrode layer.

The support member 12 used for the assembly of the fuel cell 10 can be formed by etching or cutting.

After the necessary number of the sheet body 10 and the support member 12 are prepared as described above, the assembly of the fuel cell 10 progresses as described later. The assembly of the fuel cell 10 will be described with reference to FIGS. 6 to 8. FIGS. 6 to 8 are vertical sectional schematic views of the sheet body 11 and a pair of support members 12, which supports (holds) the sheet body 11, taken along a plane that includes line 3-3 of FIG. 2 and is in parallel with a x-z plane. The line 3-3 passes the center (=the center of the planar shape (=square) of the sheet body 11) of the planar shape (=square) of the support member 12. In FIGS. 6 to 8, the shape (particularly, thickness, etc.) of the seal member 13 is illustrated with exaggeration for easy understanding of the seal member 13.

<Stacking Step>

Firstly, a glass material (e.g., slurry of borosilicate crystallized glass) that is to become the seal member 13 is applied to each of the support members at regions of its perimetric portion that comes into contact with respective sheet bodies 11 for holding the sheet bodies 11 (i.e., the glass material is applied to the lower surface of the lower frame portion 12c and to the upper surface of the upper frame portion 12b) at room temperature. Alternatively, a glass material (e.g., slurry of borosilicate crystallized glass) that is to become the seal member 13 may be applied to each of the support members at regions of its perimetric portion that is held by the upper and lower support members 12 (i.e., the glass material may be applied to the upper and the lower surfaces of the perimetric portion of the sheet body 11) at room temperature. In this embodiment, the crystallization peak temperature of the crystallized glass is 850° C., and the softening point thereof is 650° C. The crystallization rate of the crystallized glass at this stage is 0 to 20%. As described above, the crystallization rate is a ratio of presence (volume percent) of the crystalline region in the crystallized glass material. The crystallization rate of the crystallized glass, which is the subject to be measured, can be measured by utilizing a diffraction peak of the main phase in X-ray diffraction between a reference crystallized glass material and the crystallized glass material that is the subject to be measured.

Then, as shown in FIG. 6, the support members 12 and the sheet bodies 11 are stacked in alternating layers, while confining the current-collecting metal mesh. Thus, the state, in which the sheet bodies 11 and the support members 12 are stacked in alternating layers with the crystallized glass material interposed between the perimetric portion of the sheet body 11 and the perimetric portion of the support member 12 adjacent to the sheet body 11, is obtained.

<Sealing Step>

Next, the resultant laminate is subject to a heat treatment, whereby the temperature of the laminate is kept to be a first temperature (500° C. to 800° C., e.g., 700° C.) for a predetermined time. As a result, the crystallization rate of the crystallized glass is increased to 0 to 50% as shown in FIG. 7. In the figure, the case in which the number of fine dots in the crystallized glass serving as the seal member 13 is greater indicates that the crystallization rate is large (the same is true for FIG. 8). Thus, the perimetric portion of the sheet body 11 and the perimetric support member 12 adjacent to the sheet body 11 are integrated and sealed (bonded). Consequently, each of the fuel channels 22 and each of the air channels 21 are airtightly formed and defined by the crystallized glass.

Further, the crystallization rate is kept to be 0 to 50%, so that an amorphous region is sufficiently left consciously in the crystallized glass. As a result, after the completion of the sealing process, the perimetric portion of the sheet body 11 and the perimetric portion of the support member 12 adjacent to the sheet body 11 are fixed to each other so as to make the relative movement impossible, when the temperature of the laminate is less than the softening point of the crystallized glass. On the other hand, when the temperature of the laminate becomes not less than the softening point of the crystallized glass afterward, the amorphous region is softened, whereby the state in which the perimetric portion of the sheet body 11 and the perimetric portion of the support member 12 adjacent to the sheet body 11 can relatively move is obtained.

<Reduction Process Step>

Next, the laminate is again subject to a heat treatment, so that the temperature of the laminate is kept to be a second temperature (650 to 950° C., e.g., 800° C., which is higher than the first temperature) for a predetermined time. Simultaneously, a reduction gas (hydrogen gas in this embodiment) is introduced into the fuel channels 22.

With this heat treatment, the temperature of the laminate becomes not less than the softening point, whereby the state in which the perimetric portion of the sheet body 11 and the perimetric portion of the support member 12 adjacent to the sheet body 11 can relatively move is obtained. During when the state described above is obtained, the reduction process is performed to the fuel electrode layers 11b due to the introduction of the reduction gas, whereby, of NiO and YSZ constituting the fuel electrode layer 11b, NiO is reduced. As a result, the fuel electrode layer 11b becomes a Ni—YSZ cermet, thereby being capable of serving as a fuel electrode (anode electrode).

When the reduction process is performed to the fuel electrode layer 11b, the fuel electrode layer 11b contracts, with the result that the entire sheet body 11 also contracts as shown in FIG. 8. As a result, the sheet body 11 receives tensile force, at its perimetric portion, in the direction along the plane direction from the adjacent support member 12 (the upper and lower support members). When the perimetric portion of the sheet body 11 and the perimetric portion of the support member adjacent to the sheet body 11 are in the state in which they never make a relative movement, the tensile force applied to the sheet body 11 becomes excessive, which entails a problem of cracks produced on the sheet body 11. The cracks are likely to be produced as the thickness of the sheet body 11 is thinner as in the present embodiment.

On the other hand, in the present embodiment, the reduction process is performed in the state in which the perimetric portion of the sheet body 11 and the perimetric portion of the support member 12 adjacent to the sheet body 11 can make a relative movement as described above. Accordingly, even when the tensile force is applied from the support member 12 adjacent to the sheet body 11 due to the contraction of the sheet body 11 caused by the reduction process, it can be prevented that the tensile force becomes excessive. Consequently, the production of cracks on the sheet body 11 can be prevented.

Additionally, the fuel channel 22 and the air channel 21 are airtightly formed and defined at the current stage. Therefore, the supply of the reduction gas to the surface of the air electrode layer 21 during the reduction process can be prevented without taking a special measure for preventing the supply of the reduction gas to the surface of the air electrode layer 21.

In the reduction process step, the crystallization rate is sufficiently increased to 70 to 100% (the amorphous region is reduced). Thus, the perimetric portion of the sheet body 11 and the perimetric portion of the support member adjacent to the sheet body 11 are fixed by the crystallized glass in such a manner that they are difficult to make a relative movement regardless of temperature. Thus, the assembly of the fuel cell 10 is completed.

As described above, the crystallization rate of the crystallized glass serving as the seal member 13 is adjusted in two stages during the sealing step and the reduction process step. Specifically, the glass softening is consciously allowed in the sealing step, and the reduction process for the fuel electrode layer 11b is executed and the assembly of the fuel cell 10 is completed during the next reduction process step. As a result, the generation of cracks on the sheet body 11, which is caused by the contraction of the sheet body 11 due to the reduction process, can be suppressed.

Subsequently, the experiment will be described below. This experiment is conducted for confirming that "the preferable combination of the crystallization rate adjusted in the sealing step and the crystallization rate adjusted in the reduction process step is the combination of 0 to 50% and 70 to 100%". In the experiment, a sheet body of a fuel-electrode-support-type (the fuel electrode layer serves as a support substrate) was used. This sheet body is square having one side of 30 mm as viewed in plane, and includes an electrolyte layer (thickness: 3 μm) made of 8YSZ, a fuel electrode layer (thickness: 150 µm) made of NiO-8YSZ, and an air electrode layer (thickness: 15 µm) made of LSCF, those layers being stacked. Three-layer stacks were manufactured in the stacking step by using this sheet body. The experiment was conducted with the use of the three-layer stacks.

TABLE 1

| Standard | Sealing step Crystallization rate | Reduction process step Crystallization rate | Result |
| --- | --- | --- | --- |
| 1 | 8% | 72% | ○ Satisfactory sealing property after reduction process |
| 2 | 12% | 70% | ○ Satisfactory sealing property after reduction process |
| 3 | 34% | 83% | ○ Satisfactory sealing property after reduction process |
| 4 | 48% | 92% | ○ Satisfactory sealing property after reduction process |
| 5 | 50% | 98% | ○ Satisfactory sealing property after reduction process |
| 6 | 55% | 94% | X Sheet body was broken after assembly of stack |
| 7 | 63% | 88% | X Sheet body was broken after assembly of stack |
| 8 | 25% | 35% | X There was problem of sealing durability |
| 9 | 28% | 46% | X There was problem of sealing durability |
| 10 | 33% | 68% | X There was problem of sealing durability |
| 11 | 45% | 70% | ○ Satisfactory sealing property after reduction process |
| 12 | 38% | 83% | ○ Satisfactory sealing property after reduction process |
| 13 | 50% | 93% | ○ Satisfactory sealing property after reduction process |
| 14 | 42% | 98% | ○ Satisfactory sealing property after reduction process |

Table 1 shows the result in which a series of the sealing step and the reduction process step was repeated while sequentially changing the combination of the respective crystallization rates adjusted in the sealing step and the reduction process step. Whether the sheet body was broken or not was evaluated by measuring the balance of the gas flow rate to the stack. The crystallization rate was adjusted by appropriately changing the combination of crystallized glass materials (all of which were well known) serving as the seal member and the heat-treatment temperature. The heat-treatment temperature set in the experiment was 500 to 800° C. in the sealing step, and 650 to 950° C. in the reduction process step.

As shown in Table 1, when the crystallization rate of the seal member adjusted in the sealing step exceeded 50%, the sheet body was broken after the assembly of the stack (refer to the standards 6 and 7). This is considered to be based upon the reason described below. Specifically, since the crystallization rate of the seal member was high (the amorphous region was small), the seal member was difficult to soften (the perimetric portion of the sheet body and the perimetric portion of the support member were difficult to relatively move) in the next reduction process step executed in a high temperature. Accordingly, the tensile force (thermal stress) in the plane direction applied to the perimetric portion of the sheet body from the support member during the reduction process step was difficult to release. Therefore, it is considered that the tensile force became excessive, whereby the sheet body was broken.

When the crystallization rate of the seal member adjusted in the reduction process step was less than 70%, a problem of low durability of the seal member arose (refer to the standards 8 to 10). This is considered to be based upon the reason described below. Specifically, since the crystallization rate of the seal member was low (since the amorphous region was large), the degree of melting the seal member at the working temperature (high temperature) during the operation of the SOFC was increased. As a result, the perimetric portion of the sheet body and the perimetric portion of the support member were easy to relatively move during the operation of the SOFC, whereby the sealing durability was reduced.

On the other hand, it was confirmed that, when the combination of the respective crystallization rates adjusted in the sealing step and the reduction process step was the combination of 0 to 50% and 70 to 100%, the sealing property after the reduction process was satisfactory (refer to the standards 1 to 5, and 11 to 14). From the above, it can be said that the combination of the crystallization rates adjusted in the sealing step and the reduction process step was preferably the combination of 0 to 50% and 70 to 100%.

As described above, in the assembling method of the solid oxide fuel cell 10 having a (flat-plate) structure in which the sheet body (single cell), which is a fired body of the solid electrolyte layer, fuel electrode layer, and air electrode layer, and the support member (separator) are stacked in alternating layers, the sheet body 11 and the support member 12 are firstly stacked in alternating layers with the crystallized glass material interposed between the perimetric portion of the sheet body 11 and the perimetric portion of the support member adjacent to the sheet body in the stacking step. Then, in the sealing step, the resultant laminate is heated to a first temperature so as to increase the crystallization rate of the crystallized glass to 0 to 50%. With this process, the perimetric portion of the sheet body 11 and the perimetric portion of the support member 12 adjacent to the sheet body 11 are integrated and sealed. Next, in the reduction process step, the resultant laminate is heated to a second temperature (>first temperature) and a reduction gas is supplied into the fuel channel 22 so as to increase the crystallization rate of the crystallized glass to 70 to 100% and to perform the reduction process to the fuel electrode layer 11b.

As described above, the glass softening is consciously allowed in the sealing step, and in the next reduction process step, the reduction process to the fuel electrode layer 11b is executed, and the assembly of the SOFC is completed. As a result, the generation of cracks on the sheet body 11 caused by the contraction of the sheet body 11 due to the reduction process can be suppressed.

The present invention is not limited to the above-described embodiment, but can be modified in various other forms without departing from the scope of the present invention. In the above-described embodiment, the fuel electrode layer 11b can be formed from, for example, platinum, platinum-zirconia cermet, platinum-cerium-oxide cermet, ruthenium, or ruthenium-zirconia cermet.

Also, the air electrode layer 11c can be formed from, for example, lanthanum-containing perovskite-type complex oxide (e.g., lanthanum manganite, lanthanum cobaltite, or lanthanum ferrite, in addition to the above-mentioned lanthanum strontium cobalt ferrite). Lanthanum cobaltite, lanthanum manganite and lanthanum ferrite may be doped with strontium, calcium, chromium, cobalt, iron, nickel, aluminum, or the like. Also, the air electrode layer $11c$ may be formed from palladium, platinum, ruthenium, platinum-zirconia cermet, palladium-zirconia cermet, ruthenium-zirconia cermet, platinum-cerium-oxide cermet, palladium-cerium-oxide cermet, or ruthenium-cerium-oxide cermet.

In the above-mentioned embodiment, the sheet body 11 and the separator 12 have a planar shape of square. However, the sheet body 11 and the separator 12 may have a planar shape of rectangle, circle, ellipse, etc.

What is claimed is:

1. An assembling method of a solid oxide fuel cell, the solid oxide fuel cell including:
    a single or a plurality of sheet bodies that has a solid electrolyte layer, a fuel electrode layer formed on an upper surface of the solid electrolyte layer, and an air electrode layer formed on an lower surface of the solid electrolyte layer, these layers being stacked and fired; and
    a plurality of support members for supporting the single or the plurality of sheet bodies, wherein the single or the plurality of sheet bodies and the support members are stacked in alternating layers, wherein
    for each sheet body, an upper surface of a perimetric portion of the sheet body and a lower surface of a perimetric portion of an upper support member that is a support member adjacent to the upper surface of the sheet body, as well as a lower surface of the perimetric portion of the sheet body and an upper surface of the perimetric portion of a lower support member that is a support member adjacent to the lower surface of the sheet body, are respectively sealed in order that the perimetric portion of the sheet body is held between the lower surface of the perimetric portion of the upper support member and the upper surface of the perimetric portion of the lower support member, and
    for each sheet body, a fuel channel through which a fuel gas is supplied is defined and formed in a space formed between a lower surface of a plane portion located at an inner side from the perimetric portion of the upper support member and an upper surface of the fuel electrode layer in the sheet body, and an air channel through which a gas containing oxygen is supplied is defined and formed in a space formed between an upper surface of the plane portion located at the inner side from the perimetric portion of the lower support member and a lower surface of the air electrode layer in the sheet body, the method sequentially comprising:
    a stacking step in which the single or plurality of sheet bodies and the support members are stacked in alternating layers with a crystallized glass material interposed between the perimetric portion of each of the single or plurality of sheet bodies and the perimetric portion of each of the support members adjacent to the sheet body;
    a sealing step in which a crystallization rate of the crystallized glass is increased from 0 to 50% through heat application to the resultant laminate in order to seal the perimetric portion of each of the single or the plurality of sheet bodies and the perimetric portion of each of the support members adjacent to each of the single or plurality of sheet bodies; and
    a reduction process step in which the resultant laminate, which has been subjected to the sealing step, is heated and a reduction gas is supplied into the fuel channel, by which the crystallization rate of the crystallized glass is increased to 70 to 100%, and a reduction process is performed to the fuel electrode layer.

2. The assembling method of a solid oxide fuel cell according to claim 1, wherein a thickness of each of the single or the plurality of sheet bodies is 20µ or more and 500µ or less.

3. The assembling method of a solid oxide fuel cell according to claim 1, wherein the heat application in the sealing step is at a temperature within the range of 500 to 800° C., and a heating treatment temperature in the reduction process step is within the range of 650 to 950° C.

4. The assembling method of a solid oxide fuel cell according to claim 1, wherein the sealing step is performed at a first temperature for a predetermined time, and the reduction process step is performed at a second temperature, higher than said first temperature, for a predetermined time.

* * * * *

UNITED STATES PATENT AND TRADEMARK OFFICE
CERTIFICATE OF CORRECTION

PATENT NO. : 8,377,611 B2
APPLICATION NO. : 12/538370
DATED : February 19, 2013
INVENTOR(S) : Makoto Ohmori et al.

It is certified that error appears in the above-identified patent and that said Letters Patent is hereby corrected as shown below:

In the Specification

Column 7, line 2:

Please delete "the"

In the Claims

Column 13, line 17:

(claim 1, line 6): Please change "an" to -- a --

Column 14, line 29:

(claim 2, line 3): Please change "20µ" to -- 20µm -- and change "500µ" to -- 500µm --

Signed and Sealed this
Seventh Day of May, 2013

Teresa Stanek Rea
*Acting Director of the United States Patent and Trademark Office*